United States Patent [19]
Roberts

[11] Patent Number: 5,808,845
[45] Date of Patent: Sep. 15, 1998

[54] SYSTEM FOR PREVENTING SYMPATHETIC TRIPPING IN A POWER SYSTEM

[75] Inventor: Jeffrey B. Roberts, Moscow, Id.

[73] Assignee: Schweitzer Engineering Laboratories Inc., Pullman, Wash.

[21] Appl. No.: 866,882

[22] Filed: May 30, 1997

[51] Int. Cl.$^6$ ..................................................... H02H 3/18
[52] U.S. Cl. ............................... 361/79; 361/63; 361/82; 361/94
[58] Field of Search ................................. 361/76, 77, 79, 361/82, 83, 93–97, 62, 63, 65; 307/127; 364/483

[56] References Cited

U.S. PATENT DOCUMENTS

| | | | |
|---|---|---|---|
| 4,293,886 | 10/1981 | Church et al. | 361/71 |
| 4,825,323 | 4/1989 | Wilkinson | 361/65 |
| 4,825,327 | 4/1989 | Alexander et al. | 361/82 |

OTHER PUBLICATIONS

Owen, Solutions to Sympathetic Tripping of Distribution Feeders, May 2, 1977, Conference Presentation, Colorado Springs, CO.
Jackson, Synpathetic Tripping on Distribution Feeders, Apr. 12, 1993 (Conference Presentation, Texas A&M University).
Williams, Schmus and Hanson, Transmission Voltage Recovery Delayed by Stalled Air Conditioner Suppressors, IEEE Transactions on Power Systems, vol. 7, No. 3, Aug. 1992.

*Primary Examiner*—Jeffrey A. Gaffin
*Assistant Examiner*—Michael J. Sherry
*Attorney, Agent, or Firm*—Jensen & Puntigam, P.S.

[57] ABSTRACT

Negative sequence, positive sequence and zero sequence quantities are determined from voltage and current values for a power signal on a radial distribution feeder line. Negative sequence quantities are evaluated against selected threshold standards; the negative sequence impedance is also determined, which is then evaluated to determine fault direction (if a fault is indicated). If a reverse fault is declared, the trip output of overcurrent elements in the protective relay for the feeder is blocked for a selected period of time. The same evaluation process is carried out for zero sequence quantities. A selection process determines whether the negative sequence or the zero sequence element is to be enabled. Further, voltages and currents of all three phases of the power signal are evaluated to determine relative change over a period of one cycle. If within the one cycle there is a decrease of both voltage and current in all three phases of approximately 10%, the overcurrent elements are also blocked.

10 Claims, 3 Drawing Sheets

SYSTEM FOR PREVENTING SYMPATHETIC TRIPPING IN A POWER SYSTEM

TECHNICAL FIELD

This invention relates generally to protective relays for power systems, and more particularly concerns a feature of such relays concerning sympathetic or sympathy tripping of a circuit breaker which is associated with a power distribution feeder line and controlled by such a relay.

BACKGROUND OF THE INVENTION

A sympathetic (or sympathy) trip of a circuit breaker on a distribution feeder line is defined as an undesirable or erroneous trip operation which results from the presence of a temporary high current condition on an unfaulted distribution line due to or following a fault on an adjacent feeder line or the source transmission line for the feeders. More specifically, the unfaulted feeder line experiences a large surge in load current following clearance of the fault on the adjacent faulted line or the faulted source transmission line. This leads to the relay on the unfaulted feeder line producing an erroneous trip command. Hence, in a sympathetic trip, the relay on an unfaulted feeder line trips (in "sympathy") following the occurrence of a fault and its subsequent clearance on an adjacent line. A sympathetic trip is undesirable, since it is erroneous and thus causes at the very least short power outages for customers on the unfaulted feeder line, without any justifiable reason.

Although all possible causes of sympathetic tripping are not known, one known significant cause of sympathetic tripping is the use of numerous single-phase motor devices, such as air conditioners, on feeder lines. Such induction motors are typically low inertia, which means that they are prone to stall in response to a decrease in the supplied voltage. They lose their speed rapidly during the voltage dip caused by a fault originating on an adjacent feeder or a source line. As a stall occurs and the motor effective impedance decreases, the amount of current drawn by the motor will increase to the point where the trip threshold is passed and a sympathetic trip is initiated by the overcurrent relay.

It has been established that sympathetic tripping events are not uncommon and that in fact they are likely to increase, in particular due to the likely increase of single-phase induction motor loads on feeder lines. As indicated above, sympathetic tripping is undesirable not only because of the erroneous interruption in power which results, but also because it contributes to overall power system unreliability.

A number of solutions to the sympathetic tripping problem have been attempted. One solution involves simply making the overcurrent protection less sensitive by increasing the pickup level of the phase and ground overcurrent elements in the protective relays on the distribution lines. This solution has obvious drawbacks (decrease in protection sensitivity) relative to system protection. Another approach involves decreasing fault clearing times in order to reduce the actual time that the motor loads are subjected to reduced voltage. This will prevent the current to the motor from reaching such a high level as to produce a trip. In addition, the overall power system impedance could be decreased, which would decrease the line voltage drop and increase the motor terminal voltage, preventing large currents to the motor. Both of these solutions are relatively impractical, however, since they require a substantial amount of capital investment in the power system.

Lastly, undervoltage contactors could be placed on all motor loads, which would prevent excessive load current following clearance of the fault on the other lines. This solution, however, depends on the customer for implementation as opposed to the power utility, and therefore, again, is not very practical or reliable.

DISCLOSURE OF THE INVENTION

Accordingly, the present invention is a system for preventing sympathetic tripping of a circuit breaker in a power system, comprising: means for determining negative sequence current and voltage quantities from current and voltage values of the power signal on a radial power line; negative sequence directional element means for determining the direction of a possible fault on the power line, using negative sequence current and voltage quantities, means for blocking a trip signal from the negative sequence directional element if the negative sequence directional element declares a reverse direction fault on said radial line; means for determining a change in power signal voltage and current over a specific interval of time; and means for blocking a trip signal if the decrease is greater than a specific amount over said interval of time.

BEST MODE FOR CARRYING OUT THE INVENTION

Figure 1:
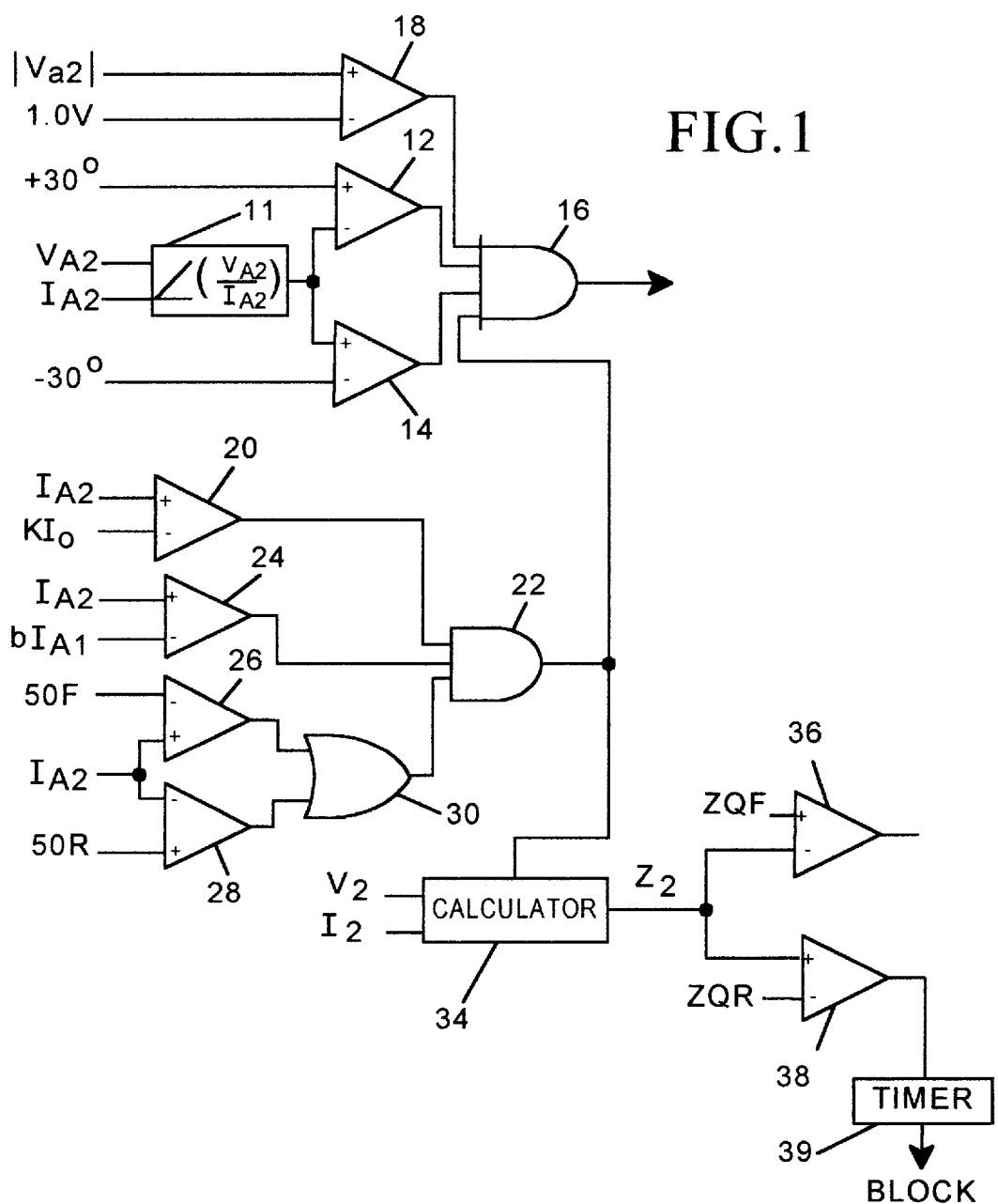
FIG. 1 is a logic diagram of one portion of the system of the present invention.

As discussed in detail above, a sympathetic trip involves a false trip on an unfaulted feeder line due to a fault on an adjacent parallel feeder line or a source (transmission) line for the two feeders. When the relay on the unfaulted feeder declares a fault, a trip signal is generated and the circuit breaker opens. After a review of several possible sympathetic trip situations, using conventional sequence quantity analysis, the inventor has discovered that for radial distribution lines a sympathetic trip condition typically results in some amount of unbalanced current flow into the relay on the unfaulted feeder, in the same direction as that which would occur for a reverse direction fault. This appears to be a consistent characteristic of a sympathetic trip condition on radial power lines.

For a radial distribution feeder (a feeder having no power source on the load side of the breaker), it is known that there is in fact no fault which can occur on such a feeder for which the protective relay for the feeder, when operating properly, will indicate to be a reverse direction fault. It is generally known that all reverse direction fault indications for a radial line are for out-of-section faults. Thus, any reverse direction current which is detected on a radial distribution feeder is an indication that an out-of-section fault has occurred. "Out-of-section" means a fault on an adjacent distribution feeder or perhaps on a source (transmission) line connected to the distribution feeders, rather than on the feeder itself. As indicated above, such a fault is a primary cause of a sympathetic trip on the unfaulted feeder.

In this particular situation (reverse direction current on a radial line), a sympathetic trip of the breaker by the relay associated with an unfaulted feeder is a distinct possibility, particularly where the load on the unfaulted distribution feeder includes a large number of single-phase induction motors, such as those present in residential air conditioning systems. This condition could exist, for instance, in newer residential areas, which might have a substantial number of air conditioning units, depending upon the geographical area. It is of course desirable to prevent the occurrence of a sympathetic trip due to such a condition.

The present invention uses the voltages and currents for each of the three phases (A, B and C) of the power signal on the distribution feeder, which are conventionally obtained by the protective relay. This is a routine step, accomplished by all such protective relays, and is therefore not described in detail here. The voltages and currents so obtained are reduced to a level appropriate for the relay processor; the sequence quantities for both the currents and voltages on a distribution line are then determined. This will include zero sequence, positive sequence and negative sequence quantities. The determination of zero, positive and negative sequence quantities from the power signal voltages and currents for each phase is a well-known process and is described in many existing patents and textbooks, including several patents owned by the assignee of the present invention. Accordingly, a detailed explanation of determining such sequence quantities is also not provided herein.

Figure 2:
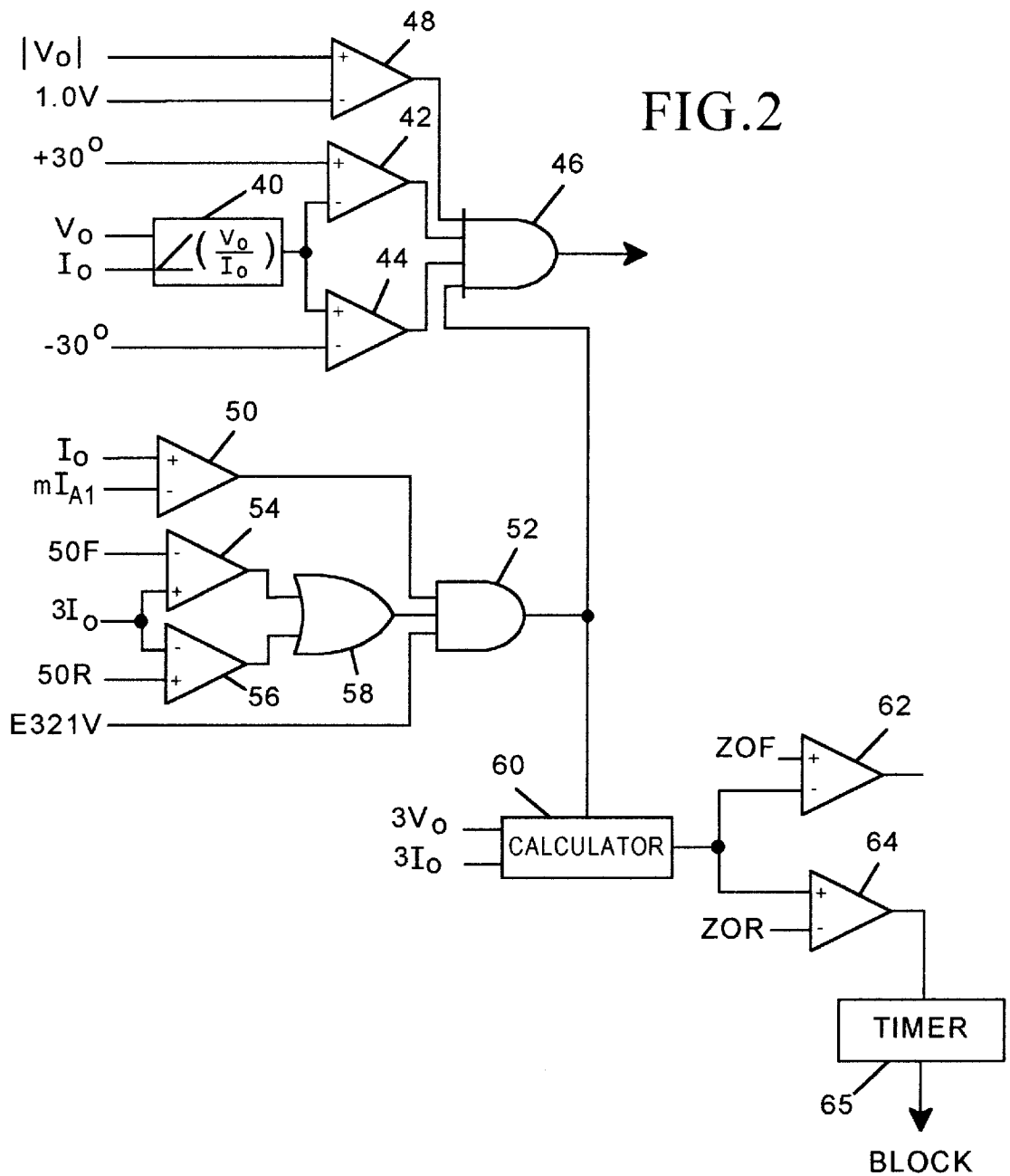
FIG. 2 is a logic diagram of another portion of the system of the present invention.
Figure 3:
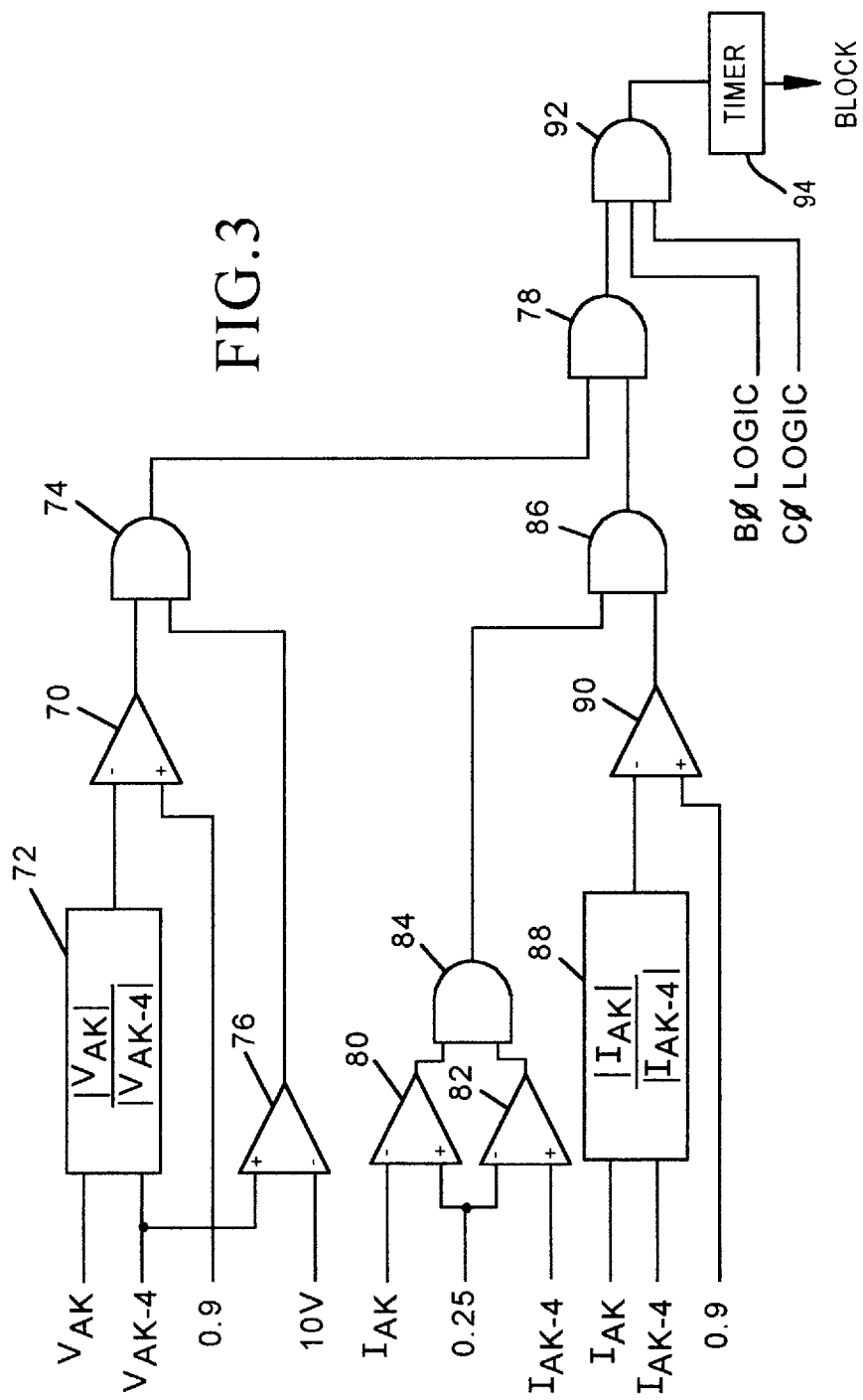
FIG. 3 is a logic diagram of a final portion of the system of the present invention.

The present invention uses selected current and voltage sequence quantities in the manner described in detail below to ascertain the presence of a sympathetic trip condition on the feeder line associated with the relay which includes the invention. If certain criteria are met concerning the sequence quantities, a blocking signal is applied to the overcurrent and/or other tripping elements in the protective relay to prevent the sympathetic tripping of the associated circuit breaker for the feeder line. FIGS. 1, 2 and 3 show the logic circuitry to implement the invention. It should be understood that the figures and the description teach one particular implementation of the present invention to accomplish the recognition of a sympathetic trip condition. Alternative logic circuits and other means may use a similar functional approach to accomplish similar results and be within the scope of the invention.

FIG. 1 shows a logic circuit which uses negative sequence voltages and currents to determine the presence of a reverse direction current toward the protective relay on a radial distribution feeder. As indicated above, the presence of such a reverse current on a radial distribution feeder is an indication of a possible sympathetic trip condition.

Referring now to FIG. 1 in detail, negative sequence voltage $V_{A2}$ (referenced to phase A) and the negative sequence current $I_{A2}$ (referenced to phase A) are applied as inputs to an angle calculator 11. The angle calculator 11 is conventional in function, structure and operation. The output of angle calculator 11, which is the angular difference in degrees between the input voltage and current, is applied to comparators 12 and 14. In comparator 12, the angle is compared against a boundary angle value of +30°, while in comparator 14, the angle is compared against a boundary value of −30°. Hence, the angle between the negative sequence voltage and current must be between +30° and −30°. This angular window is to accommodate certain resistive load situations for which there might not otherwise be the ability to declare a reverse fault.

The outputs of comparators 12 and 14 are applied as two inputs to AND gate 16. A third input to AND gate 16 is the result of a threshold or minimum voltage determination for the negative sequence voltage. This is accomplished by comparator 18. Comparator 18 compares the negative sequence voltage against a threshold value of one volt. The voltage threshold may be varied somewhat depending upon a particular situation. The negative sequence current is also compared against a threshold value. This will be discussed in more detail below.

The directional element arrangement used in the present invention (to make a fault direction determination) must be quite sensitive. To maintain sensitivity in the particular embodiment shown, two directional elements are used, a negative sequence directional element and a zero sequence directional element. However, only one of these directional elements is used at a particular time. Also, it is possible to have a system in which only one directional element is used, such as, for example, just a negative sequence element. In deciding which directional element to use in a particular situation in the embodiment shown, a three-part test is used. First the ratio of negative sequence current to zero sequence current is evaluated. In this one test, if the magnitude of the negative sequence current $I_{A2}$ (referenced to phase A) is greater than the zero sequence current $I_0$ multiplied by a constant "k", the use of the negative sequence directional element is indicated. This determination is accomplished by a comparator 20, which has inputs of $I_{A2}$ (negative sequence current) and $kI_0$ (zero sequence current multiplied by a constant k), where the range of k is 0–1. A typical value for k is 0.2. This means that the negative sequence directional element is indicated unless the zero sequence current is five (or more) times larger than the negative sequence current.

The output of comparator 20 is applied as one input to an AND gate 22. Another directional element selection test is carried out by comparator 24, which performs a positive sequence current threshold check or determination. If the magnitude of the negative sequence current $I_{A2}$ (referenced to phase A) is greater than the positive sequence current $I_{A1}$ (referenced to phase A) times a constant "b", the negative sequence directional element is again indicated. The output of comparator 24 is applied as another input to AND gate 22. The action of comparator 24 ensures that the negative sequence current has a reasonable value with respect to the positive sequence current.

An undesired negative sequence directional element operation may occur due to a three-phase, fault-generated negative sequence current. For such three-phase faults, the magnitude of the positive sequence current is very much greater than the magnitude of the negative sequence current. Typical values of "b" will be 0.08. This means that the negative sequence directional element is indicated unless the positive sequence current is at least 12.5 times greater than the negative sequence current, which would indicate the presence of a three-phase fault or heavy load (and not a sympathetic trip condition).

A third (and last) input to AND gate 22 and the third test to enable the negative sequence directional element is accomplished by comparators 26 and 28 and an OR gate 30. Comparators 26 and 28 ensure that the negative sequence current $I_{A2}$ (referenced to phase A) has sufficient magnitude to be reliable. The outputs of either comparator 26 and 28 being high and hence the output of OR gate 30 being high indicates that the magnitude of the negative sequence current is greater than the forward direction sensitivity threshold (50F) or the reverse direction sensitivity threshold (50R), both of which have been previously established in the relay. When the three inputs to AND gate 22 are all high, meaning that the criteria for selecting the negative sequence directional element have been satisfied, the output of AND gate 22 is high.

This signal is applied to AND gate 16 and as an "enable" to a calculation circuit 34. If the other inputs (discussed above) to AND gate 16 are high, the output of AND gate 16 is high. If this is the case, then the zero sequence directional element is disabled and the negative sequence directional element is enabled. If the output of AND gate 16 is high, the algorithm for calculating the negative sequence impedance is:

$$Z_2 = \frac{Re[V_2 \cdot (I_2)^*]}{|I_2|^2} \quad \text{(Equation 1)}$$

where $V_2$ and $I_2$ are the negative sequence voltage and current, while $I_2^*$ is the complex conjugate of the negative sequence current. The negative sequence current and voltage values are all referenced to phase A, so that designation is not specifically set forth. This is true for Equation 2 below as well.

If the output of AND gate 16 is low, then the algorithm for calculating negative sequence impedance is:

$$Z_2 = \frac{Re[V_2 \cdot (I_2 \cdot 1 \angle Z_2 ANG)^*]}{|I_2|^2} \quad \text{(Equation 2)}$$

The above two equations differ, in that Equation 2 includes a phase angle shift, while Equation 1 does not. Typically, the prefault phase current will slightly lag the prefault phase voltage, indicating that the feeder is serving a slightly inductive load. This is referred to as the feeder load angle. Since the ideal feeder load angle is 0°, utilities and industrial customers typically install shunt capacitors to change the feeder angle to 0° to reduce the feeder current loading. When the feeder angle is zero, the negative sequence current and the negative sequence voltage are in phase.

A high from AND gate 16 indicates that the feeder phase angle in a particular case is less than +30°. This condition is a requirement for Equation No. 1. If the feeder phase angle is high (greater than ±30°), then Equation No. 2 is appropriate. With the two equations, feeder circuits with both inductive and resistive loads can be serviced.

Whichever equation is used, it is implemented by a calculator 34, which has inputs of negative sequence voltage ($V_2$) and negative sequence current ($I_2$). The output of calculator 23 is applied to two comparators 36 and 38. In comparator 36, the output of calculator 34 is compared against a ZQF value which is the minimum (threshold) value of expected negative sequence impedance plus a small margin for forward faults. ZQF is normally set to one-half of the protected line impedance (replica line impedance). ZQF must be less than the sum of the negative sequence line impedance ($Z_{L2}$) and the remote negative sequence impedance ($Z_{R2}$) for those applications in which there is a remote positive sequence power source. When $Z_2$ is less than ZQF, the output of comparator 36 is high, indicating a forward direction fault. This signal is not used to block any trip signals which may be generated by the relay.

The threshold input to comparator 38 is referred to as ZQR, which is the minimum (threshold) expected negative sequence impedance for reverse unbalanced faults. The minimum ZQR setting is ZQF plus 0.1 ohms secondary. When $Z_2$ is greater than ZQR, the output of comparator 38 is high, ordinarily indicating a reverse fault. This is an indication of a sympathetic trip in the circuit of FIG. 1. This signal is applied to a programmable time-delayed drop-out timer 39. The output of timer 39 is used to block the operation of the protective overcurrent elements for the amount of the time delay. Typical delays will range from 20 to 30 seconds. A sympathetic trip thus is prevented from occurring.

FIG. 2 shows the logic-sequence for zero sequence quantities. It is generally quite similar to the negative sequence circuit of FIG. 1. For simplicity, all the designations of voltage and current just use the zero sequence designation. The circuit includes an angle calculator 40 which determines the angle between the zero sequence voltage ($V_0$) and the zero sequence current ($I_0$) quantities which have been determined from the power system voltage and current values, as discussed above. The output of angle calculator 40 is applied to comparators 42 and 44. Comparator 42 compares the angle against a +30° threshold, while comparator 44 compares the angle against a −30° threshold. Hence, for the outputs of both comparators 42 and 44 to be high, the angle must be between +30° and −30°. The 40 outputs of comparators 42 and 44 are applied to an AND gate 46.

Comparator 48 compares the magnitude of the zero sequence voltage against a threshold value of one volt. If the zero sequence voltage is greater than one volt, the output of comparator 48 is high, providing a third high input to AND gate 46.

The magnitude of the zero sequence current $I_0$ is compared against the magnitude of the positive sequence current $I_{A1}$ times a constant m in comparator 50. If $I_0$ is greater than $mI_{A1}$ then the output of comparator 50 is high, which is applied at one input to AND gate 52. Comparator 50 ensures that the zero sequence current has a reasonable value relative to the amount of positive sequence current. An undesired zero sequence directional element operation may occur due to three-phase, fault-generated zero sequence current. A typical value of m is 0.08, such that the zero sequence directional element is enabled (as opposed to the negative sequence element) unless the positive sequence current is 12.5 times greater than the zero sequence current.

The zero sequence current is also compared against selected threshold values, both for forward (50F) and reverse (50R) directions. These threshold comparisons are implemented by comparators 54 and 56. Comparator 54 compares the zero sequence current against the minimum forward threshold value designated 50F while comparator 56 makes a comparison with a minimum reverse threshold value designated as 50R. Typical threshold values for 50F and 50R could be 0.5 amps (for both), which is 10% of a maximum load of 5 amps, although in some cases 50R could be somewhat less. The outputs of comparators 54 and 56 are applied to an OR gate 58. The output of OR gate 58 is applied as another input to AND gate 52.

In addition, the input referred to in FIG. 2 as E32IV to AND gate 52 is a programmable "enable" by which the operation of the zero sequence directional element can be defeated. One example where this would be used is when zero sequence source isolation is detected.

When the inputs to AND gate 52 are all high, the output is a high which is applied to AND gate 46 and calculator element 60. The zero sequence directional element is then enabled. If all the inputs to AND gate 46 are high, then the output of AND gate 46 is high and the algorithm for calculating zero sequence impedance is:

$$Z_0 = \frac{Re[3V_0 \cdot (3I_0)^*]}{|3I_0|^2} \quad \text{(Equation 3)}$$

where $3V_0$ and $3I_0$ are zero sequence voltage and current.

If, however, the output of AND gate 46 is low, the algorithm for calculating $Z_0$ is:

$$Z_0 = \frac{Re[3V_0 \cdot (3I_0 \cdot 1\angle Z_0 ANG^*)]}{|3I_0|^2} \quad \text{(Equation 4)}$$

The selected equation is carried out by the calculation member 60, which has inputs of zero sequence voltage ($3V_0$) and zero sequence current ($3I_0$). The output of the calculation member 60 is the zero sequence impedance ($Z_0$) which is applied as an input to comparators 62 and 64, respectively. The other input to comparator 62 is a threshold value which establishes the minimum expected zero sequence impedance plus some margin for forward faults. Normally, ZOF is set to one-half of the replica zero sequence line impedance. ZOF must be less than the zero sequence line impedance ($Z_{LO}$) plus the zero sequence remote impedance ($Z_{RO}$) in those applications where there is a remote zero sequence source. When the zero sequence impedance $Z_0$ is less than ZOF, the output of comparator 62 is high, indicating a forward direction fault. This signal is not used to block any of the directionally controlled or other trip elements in the relay.

The threshold value for comparator 64 is ZOR which establishes the minimum zero sequence impedance for reverse ground faults. The minimum setting of ZOR is ZOF plus 0.1 ohms secondary. When $Z_0$ is greater than ZOR, the output of comparator 64 is high, indicating a reverse fault. This is an indication of a sympathetic trip condition on a radial feeder. This output is used as an input to a programmable time delayed drop out timer 65 (which could be timer 39 in FIG. 1). The output of the timer 65 is then used to block the operation of any overcurrent element for the duration of the time delayed setting. A sympathetic trip is thus prevented.

FIG. 3 shows the circuitry for determining the presence of an external balanced fault. Comparator 70 compares the ratio of absolute value voltage of one of the phases, for instance the A phase voltage, of the most recent sample ($V_{Ak}$) and the A phase voltage of one cycle (four sample times) earlier ($V_{Ak-4}$) against a value of 0.9. The ratio value is determined by calculator 72. The threshold value of 0.9 is an appropriate selection for both speed and security of current operation. If $|V_{Ak}|/|V_{Ak-4}|$ is less than or equal to 0.9, then the output of comparator 70 is high and is applied to an AND gate 74. The other input to AND gate 74 is from comparator 76. Comparator 76 compares the value of $V_{Ak-4}$ against a threshold value of 10 volts. A threshold of 10 volts is selected such that the magnitude determination is reliable.

If both inputs to AND gate 74 are high, meaning that the two threshold comparisons have been exceeded, a high output from AND gate 74 results, which is one input to AND gate 78.

Another threshold comparison is made by comparators 80 and 82. The magnitude of one phase (e.g. A phase) of current from the most recent current sample ($I_{Ak}$) is applied at one input to comparator 80, while the magnitude of A phase current from the previous cycle (four sample periods back, $I_{Ak-4}$) is applied at one input to the other comparator 82. Each comparator has threshold values of 0.25. Hence, comparators 80 and 82 check the magnitude of the current. Each sample must exceed 0.25 amps secondary. This threshold "qualifies" the magnitude check of the current. If the outputs of both comparators 80 and 82 are high, the output of AND gate 84 is also high and is applied as one input to AND gate 86.

Calculation circuit 88 provides a ratio value of $I_{AK}$ and $I_{AK-4}$. The output from calculation circuit 88, which is a ratio number, is applied as one input to comparator 90. The other input to comparator 90 is a threshold value of 0.9. Again, this threshold value is appropriate for both speed and accuracy of the circuit. In effect, the ratio produced by calculation circuit 88 must be less than 0.9, i.e. $|I_{AK}|$ must be less than 0.9 $|I_{AK-4}|$. The output of comparator 90 is applied as another input to AND gate 86. If the outputs from AND gate 84 and comparator 90 are both high, the output from AND gate 78 will also be high. This will result in a high input to AND gate 92. A high input from AND gate 78 indicates that both A phase voltage and A phase current are decreasing. The other inputs to AND gate 92 are signals from the comparable B phase and the C phase logic circuits.

When the voltage and current values from each of the three phases meets the requirements of the logic circuit of FIG. 3, the output of AND gate 92 is high. The output from AND gate 92 will be high only if all three phases simultaneously have a decrease in voltage and current. This condition is a reliable indication of a possible sympathetic trip situation and the resulting signal is sent to a programmable timer 94 (which could be the same timer as for the circuits of FIGS. 1 and 2), the output of which is used to block the action of the directionally controlled trip elements in the relay for the specified period of time.

Hence, a system for preventing sympathetic tripping has been disclosed which utilizes zero sequence and negative sequence quantities, as well as comparison of voltages and currents for all three phases for a three-phase balanced fault.

Although a preferred embodiment of the invention has been disclosed herein for illustration, it should be understood that various changes, modifications and substitutions may be incorporated in such embodiment without departing from the spirit of the invention, which is defined by the claims which follow.

What is claimed is:

1. A system for preventing sympathetic tripping of a circuit breaker on a radial power line in a power system, comprising:

means for determining negative sequence current and voltage quantities from current and voltage values of a power signal on a radial power line;

negative sequence directional element means for determining the direction of a possible fault on the radial power line, using negative sequence current and voltage quantities;

means for blocking a trip signal from the negative sequence directional element if the negative sequence directional element declares a reverse direction fault;

means for determining a decrease in voltage and current of the power signal over a specific period; and means for blocking a trip signal if the decrease is greater than a specific amount over said period.

2. An apparatus of claim 1, including means for determining zero sequence current and voltage quantities from current and voltage values of a power signal on a power line; zero sequence directional element means for determining the direction of a possible fault on the power line, using zero sequence current and voltage quantities, means for blocking a trip signal from the zero sequence directional element if the zero sequence element declares a reverse direction fault; and means for enabling a selected one of the (1) negative sequence directional means and 2) the zero sequence directional means.

3. An apparatus of claim 1, wherein said decrease in voltage and current is for all three phases of the power signal.

4. An apparatus of claim 2, including means for establishing operating thresholds of negative sequence voltage and current quantities and zero sequence voltage and current quantities.

5. An apparatus of claim 4, wherein the threshold current value for the negative sequence current is 0.08 times the positive sequence current of the power signal and 0.2 times the zero sequence current, and the threshold current for the zero sequence current is 0.08 times the positive sequence current of the power signal.

6. An apparatus of claim 2, wherein the negative sequence directional element uses the formula:

$$Z_2 = \frac{Re[V_2 \cdot (I_2)^*]}{|I_2|^2}$$

to calculate negative sequence impedance for each phase of the power signal if the angle between the negative sequence voltage and the negative sequence current is within a specified range; otherwise, the formula for negative sequence impedance is:

$$Z_2 = \frac{Re[V_2 \cdot (I_2 \cdot 1 \angle Z_2 ANG)^*]}{|I_2|^2}$$

and wherein the zero sequence directional element uses the formula:

$$Z_0 = \frac{Re[3V_0 \cdot (3I_0)^*]}{|3I_0|^2}$$

to calculate zero sequence impedance to each phase of the power signal if the angle between the zero sequence voltage and the zero sequence current is within a specific range; otherwise, the formula for zero sequence impedance is:

$$Z_0 = \frac{Re[3V_0 \cdot (3I_0 \cdot 1 \angle Z_0 ANG)^*]}{|3I_0|^2}$$

where the negative sequence impedance and the zero sequence impedance are used to make the fault direction decision.

7. An apparatus of claim 5, wherein the specified range is between −30° and +30°.

8. An apparatus of claim 6, wherein if the negative sequence directional element is enabled, the negative sequence impedance is compared against first direction threshold values to determine reverse and forward fault directions, and wherein if the zero sequence directional element is enabled, the zero sequence impedance is compared against second direction thresholds to determine the reverse and forward fault directions.

9. An apparatus of claim 2, including means for disabling the zero sequence direction determining means.

10. An apparatus of claim 1, wherein said specified amount of decrease for voltage and current is approximately at least 10% over one cycle of the power signal.

* * * * *